(12) United States Patent
He

(10) Patent No.: US 7,675,542 B2
(45) Date of Patent: Mar. 9, 2010

(54) CAMERA CONTROLLER

(75) Inventor: Aiguo He, Aizu-Wakamatsu (JP)

(73) Assignee: University of Aizu, Fukishima (JP)

( * ) Notice: Subject to any disclaimer, the term of this patent is extended or adjusted under 35 U.S.C. 154(b) by 1169 days.

(21) Appl. No.: 11/135,652

(22) Filed: May 24, 2005

(65) Prior Publication Data
US 2005/0264655 A1 Dec. 1, 2005

(30) Foreign Application Priority Data
May 25, 2004 (JP) .............................. 2004-155109

(51) Int. Cl.
H04N 7/18 (2006.01)
H04N 5/232 (2006.01)
(52) U.S. Cl. .................. 348/135; 348/211.99
(58) Field of Classification Search ............ 348/211.99, 348/211.8, 135
See application file for complete search history.

(56) References Cited

U.S. PATENT DOCUMENTS 5,164,827 A * 11/1992 Paff ........................... 348/143
7,184,088 B1 * 2/2007 Ball ........................... 348/348
7,298,400 B2 * 11/2007 Taguchi ..................... 348/211.8
2004/0027347 A1 * 2/2004 Farsaie ........................ 345/419
2004/0027460 A1 * 2/2004 Morita .................... 348/211.99

FOREIGN PATENT DOCUMENTS

| JP | 07-274150 | 10/1995 |
| JP | 2000-352653 | * 12/2000 |
| JP | 2003-134382 | 5/2003 |

* cited by examiner

Primary Examiner—Sinh Tran
Assistant Examiner—Hung H Lam
(74) Attorney, Agent, or Firm—Squire, Sanders & Dempsey, L.L.P.

(57) ABSTRACT

A camera controller establishes a desired shooting range as the direction of a camera is changed. Coordinate data on a pseudo subject-plane representing a subject-plane virtually covering a plurality of subjects to be shot by the camera are stored. The direction of the camera is indicated by a cursor or the like on the image displayed on a display unit. Coordinates of an intersection point of a straight line extending from the camera in the instructed direction with the pseudo subject-plane stored in the memory are determined, and the distance between the camera and the intersection point is calculated.

10 Claims, 6 Drawing Sheets

CAMERA CONTROLLER

BACKGROUND OF THE INVENTION

1. Field of the Invention

The present invention relates to a technology for controlling a remote camera and a network camera used for video conferencing, and real-time remote schooling.

2. Background

Japanese Patent Application Publication (JPAP) No. 07-274150 discloses a monitoring system. When an operator at a distant place specifies with a pointing device a range a screen which the operator wants to zoom in, the system calculates the view angle of a camera lens and the direction of the camera. The calculated information is sent to a camera controller for controlling the camera JPAP No. 2003-134382 describes that a still image from a remote-controlled video camera is displayed on a screen of a monitor at the same time as a moving image from the video camera. The video camera is controlled by specifying a position on the still image with a mouse so that the specified position is located at the center of the moving image. The video camera is controlled by operating with a mouse a pan control cursor, a tilt control cursor, and a zoom control cursor, which are displayed on the screen of the monitor.

The camera-to-subject distance changes when the direction of the camera is changed in order to shoot a different subject, resulting in a different shooting range. That is, shooting screen range (shooting range) changes. In order to keep the same shooting range, zoom adjustment is required after the direction of the camera is changed. Focus adjustment may be carried out by visual observation by the operator, or by calculation based on measurement of the camera-to-subject distance using a distance measuring function installed in the camera.

However, because the above-described technique takes time, some time is required before the camera is directed to a subject to be photographed, and a desired shooting range is established. Accordingly, there is a need for a technology for controlling a remote camera that can rapidly establish a desired shooting range as the direction of a camera is changed.

SUMMARY OF THE INVENTION

A control system for a camera according to the present invention is provided with a memory for storing coordinate data of a pseudo subject-plane that represents a subject-plane including subjects in a subject space to be shot with a camera. The control system includes a display unit for displaying an image shot with the camera, and includes a directing device for indicating on the image displayed on the display unit a direction to which the camera is required to be directed. The control system includes means for determining coordinates of an intersection point at which a straight line extending from the camera in the direction instructed by the directing device intersects the pseudo subject-plane stored in the memory. The control system includes means for calculating a distance between the camera and the intersection point.

According to the present invention, a pseudo subject-plane which virtually covers a plurality of subjects for shooting is stored in a memory beforehand. When the direction of the camera is changed, coordinates of the intersection point at which a straight line extending from the camera and the pseudo subject-plane are determined, and a distance from the camera to the intersection point is calculated. Based on this distance, a zooming amount for obtaining a predetermined shooting range, and a focusing amount for focus adjustment can be calculated. Thus, as the direction of the camera is changed, zooming is varied to obtain a desired shooting range.

According to another aspect of the present invention, the control system is further provided with a camera-information registration memory which stores a position of the camera in three-dimensional coordinates in the subject space, the direction of the camera in an initial condition with zero angle value and information including a minimum view angle and a maximum view angle of the camera. Based on status data transmitted from the camera including data indicating a present angle and the information stored in the camera-information registration memory, angle-value calculating means included in the control system calculates according to an input from the directing device angle values by which the camera is to be panned and tilted.

The angle-value calculating means is provided with means for calculating an angle-value difference by which the current angle transmitted from the camera needs to be changed to reach an angle for directing the camera to a direction instructed by the directing device. The calculating means calculates a view angle corresponding to the width of an image screen based on the current zoom amount, and computes a pan-angle difference based on the width of the image screen, a horizontal distance from the center of the image screen to the point on the image screen indicated by the directing device and the view angle corresponding to the width of the image screen.

According to further another aspect of the present invention, the angle-value calculating means is provided with means for calculating an angle-value difference by which the current angle value transmitted from the camera needs to be changed to achieve an angle value which is required for directing the camera to a direction indicated by the directing device. The calculating means calculates a view angle corresponding to the width of an image screen based on the current zoom amount, and computes a tilt-angle difference based on the width of the image screen, a horizontal distance from the center of the image screen to a point on the image screen which is indicated by the directing device and the view angle corresponding to the width of the image screen.

DETAILED DESCRIPTION OF THE PREFERRED EMBODIMENTS

Figure 1:
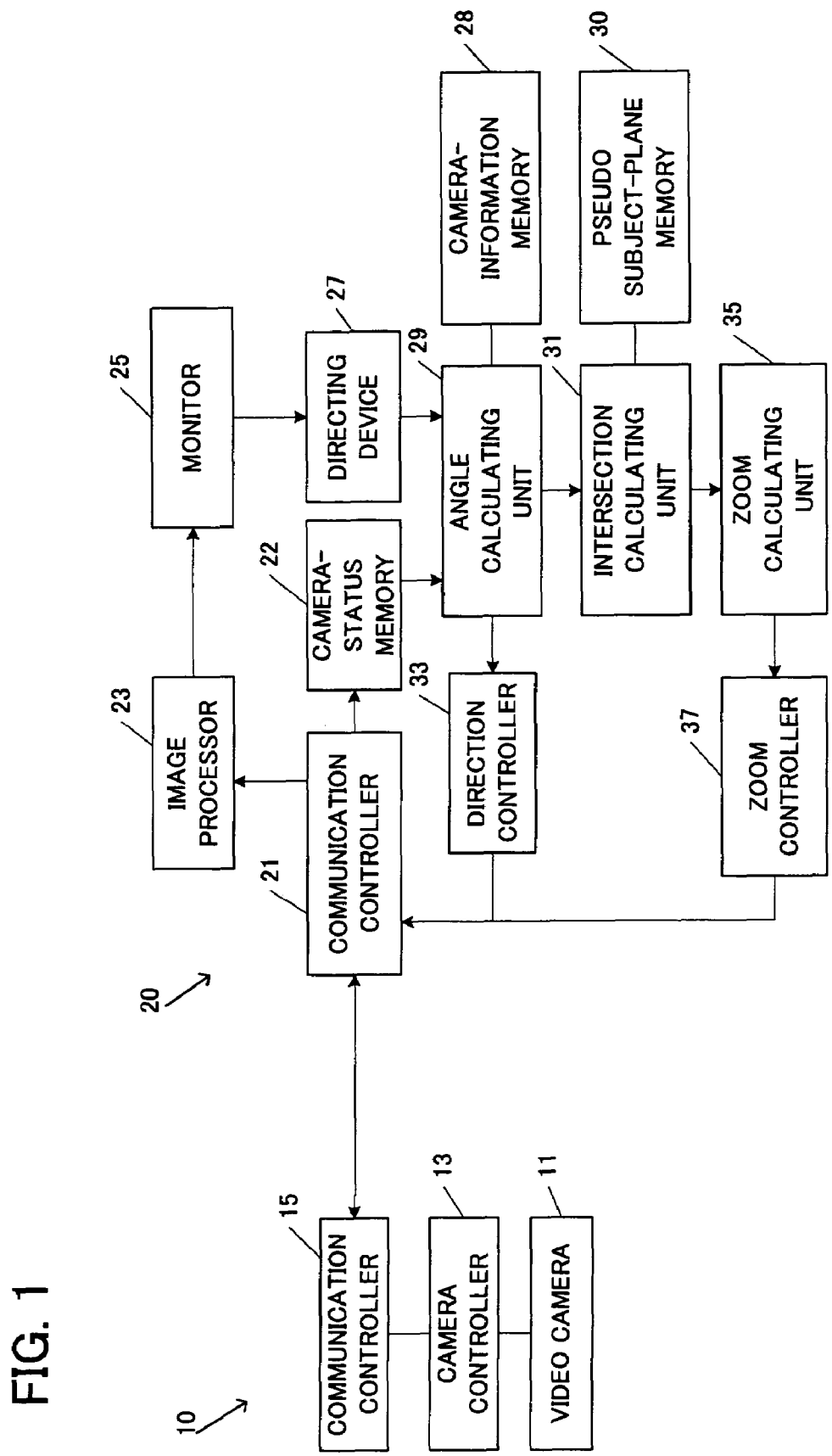
FIG. 1 is a block diagram showing a control system according to an example of the present invention.
Figure 2:
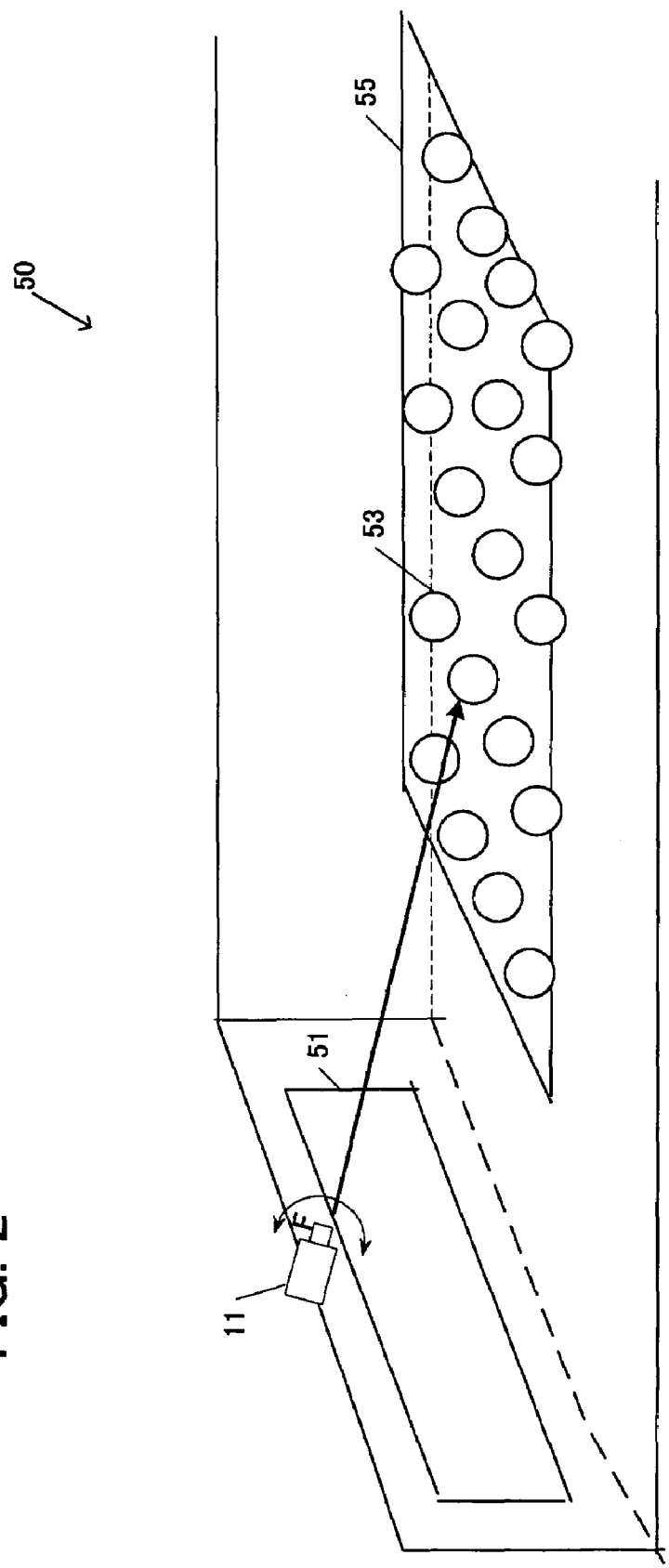
FIG. 2 is a view showing one example of a pseudo subject-plane.

One embodiment of the present invention will be described referring to drawings. FIG. 1 is a view showing a configuration of a camera and a control system. As shown in FIG. 2, a camera unit 10 including a video camera 11 is disposed, for example, in a front upper portion of a classroom in which a remote schooling is performed. A lecturer, a professor, or a teacher displays a teaching material on a screen 51 in the classroom from a distant room, and give a lecture while monitoring reactions of the students with the camera 11. The camera 11 is mounted on a camera platform which changes the direction of a camera. The platform is controlled and driven by a camera controller 13. The camera 11 includes a remote-controlled zoom mechanism which is controlled by a control signal from the camera controller 13. The distant room in which a teacher stays is provided with a control system 20. Data and instructions are exchanged through communication between a communication controller 21 in the control system 20 and a communication controller 15 in the camera.

A control system 20 is essentially a computer, and can be a general-purpose personal computer, a workstation, a small-scale computer, and the like which is programmed to perform the functions illustrated in FIG. 2. The computer is provided with an arithmetic processing unit (processor), a random-access memory (RAM) providing work areas for operations by the processor, a nonvolatile memory such as a hard disk storage for storing computer programs and data, and an input device for entering programs, data and commands.

FIG. 1 illustrates functional blocks of the control system 20 realized by a programmed computer. Moving images captured with the video camera 11 is sent to the communication controller 21 in the control system 20 by the communication controller 15 through the camera controller 13, and is displayed on the screen of a monitor 25 after processed by an image processing unit 23. The monitor 25 is a display unit for the computer, and, typically, a cathode ray tube (CRT) or a liquid crystal display (LCD). The camera controller 13 transmits data indicating a current angle value and a current zoom position of the camera to the control system 20 in association with the image captured by the camera. The data is stored as latest status information of the camera in the camera-status memory 22.

The angle value, and the zoom position of the camera 11 are in accordance with the data transmitted as a control signal to the camera unit 10 from the control system 20.

Pseudo Subject-Plane

In one embodiment of the present invention, an approximation equation representing a curved surface 55 including heads 53 of the students who are seated at desks in the classroom as shown in FIG. 2 is determined beforehand and is stored in the pseudo subject-plane memory 30. Though the pseudo subject-plane 55 is expressed as a plane in FIG. 2, it is a curved surface in the case of a classroom where desks are disposed step-wise surrounding a teacher's platform in a circular manner. Such a pseudo subject-plane can be formed by connecting and combining partial planes of one or a plurality of analytical curved surfaces (a planar plane, a spherical plane, a cylindrical plane, a circular conical plane, and the like).

Angle Value Calculation

A directing device 27 is connected to the monitor 25. Typically, the directing device 27 is a mouse, and, when an operator clicks a position on the monitor screen to which the operator wants to direct the camera, an operation starts to direct the camera to the clicked position. Details of the operation are as follows.

An angle-value calculating unit 29 calculates a pan amount and a tilt amount for directing the camera 11 to the instructed direction based on an input from the directing device 27, a current angle value and a current zoom amount of the camera 11 stored in the camera-status memory 22.

First, a view angle "a" corresponding to the width of the image screen at a current zoom amount z is obtained with the following equation:

$$a = k_a z + A_{max} \quad (1)$$

Where, $$k_a = -(A_{max} - A_{min})/Z_{max}$$

$A_{max}$: the maximum view angle
$A_{min}$: the minimum view angle
$Z_{max}$: a zoom amount at the minimum view angle (the maximum value of z)

Figure 4:
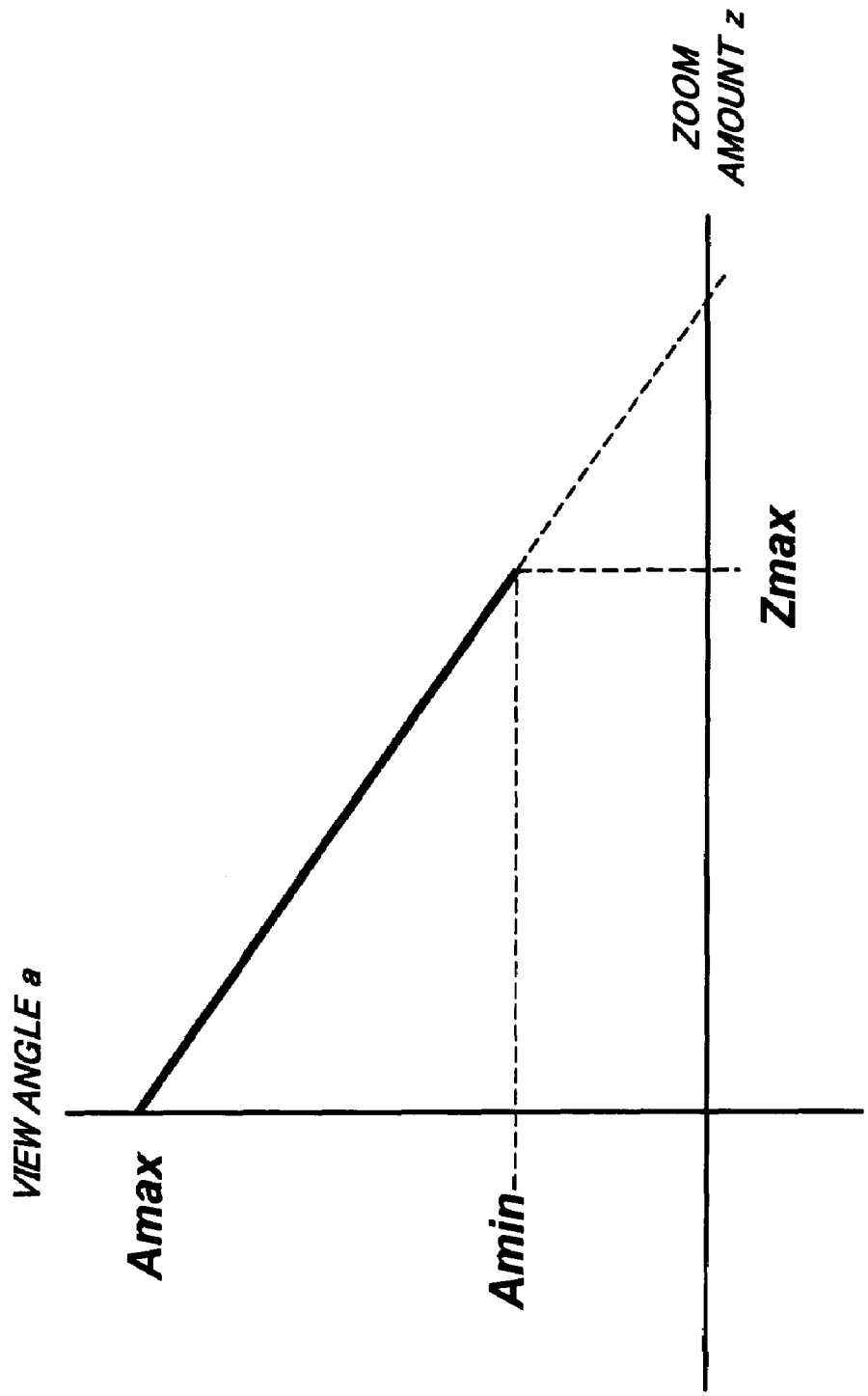
FIG. 4 is a graph showing relations between angles of view and zoom amounts.

Referring to FIG. 4, the view angle becomes maximum when the zoom of the camera is minimum, that is, when the zoom amount z is 0 (initial zoom position). The view angle becomes minimum when the zoom is at the maximum value. The minimum zoom position and the corresponding maximum view angle $A_{max}$, and the maximum zoom position and the corresponding minimum view angle $A_{min}$ are defined by the specifications of the camera. The minimum zoom position, the maximum view angle $A_{max}$, the maximum zoom position, and the minimum view angle $A_{min}$ are entered from a keyboard (not shown) when setting up the system, and are recorded in a camera-information registration memory 28. The view angle "a" decreases in proportion to the zoom amount z (distance from the initial zoom position). "$k_a$" is proportionality factor of the zoom amount, and represents a difference of the view angle per unit amount of zoom. An initial maximum view angle $A_{max}$ is a view angle when the camera is directed to a predetermined direction as shown in FIG. 2 for example and is at the initial zoom position.

Figure 5:
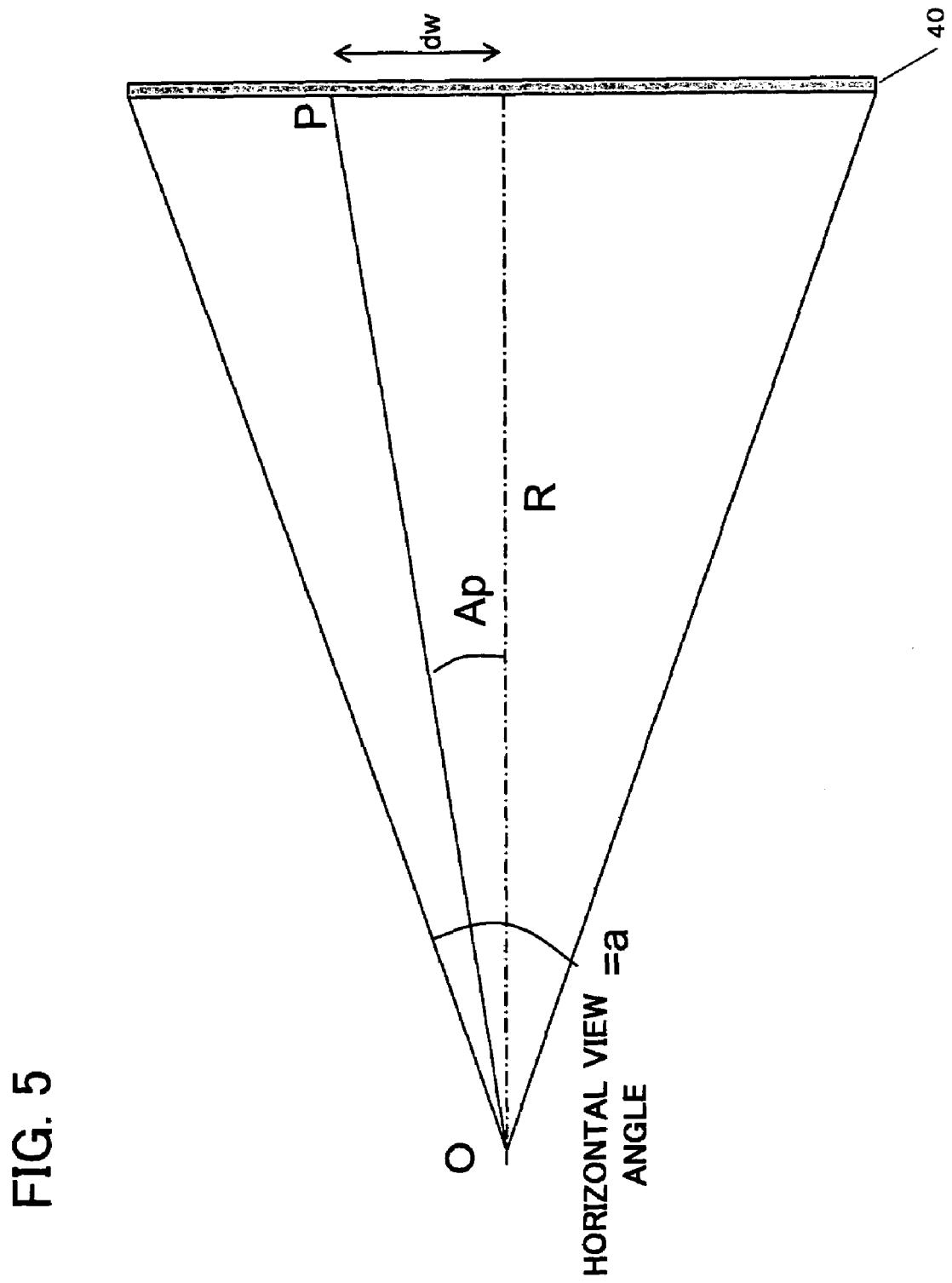
FIG. 5 illustrates the relation of view angle and zoom amount for determining a pan angle.

Referring to FIG. 5, a difference Ap of a pan angle is calculated for moving the camera from a direction (current direction) to the direction toward the point P on the screen indicated by the directing device 27. In FIG. 5, the point O is a virtual point from which a equation for calculating Ap is derived.

A horizontal view angle "a" is an angle made by two straight lines, extending from the point O to the right and left ends of the image screen 40 in the horizontal direction. The width of the image screen 40 is represented by W and the distance from the center of the image screen 40 to the point P is represented by dw. Then, the following equations are led from the relations illustrated in FIG. 5.

$$\tan(a/2) = W/2/R \quad (2)$$

$$\tan(Ap) = dw/R \quad (3)$$

R obtained from equation (2) is entered into equation (3) to obtain the following equation (4):

$$\tan(Ap) = (2dw/W) * \tan(a/2) \quad (4)$$

Accordingly, the following equation (5) is led.

$$Ap = \tan^{-1}((2dw/W) * \tan(a/2))$$

$$\tan^{-1}(\tan(a/2) * 2dw/W) \quad (5)$$

Figure 6:
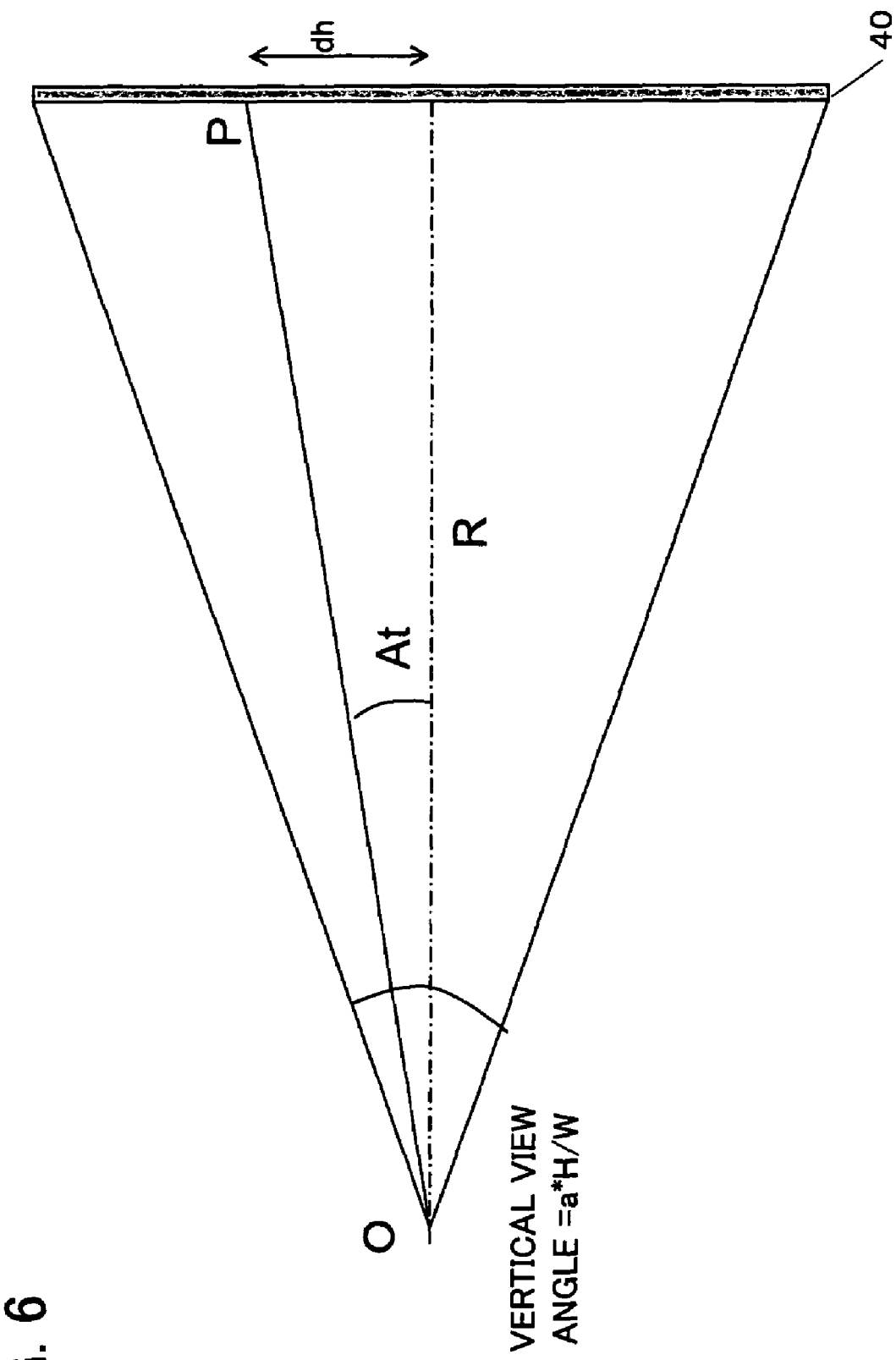
FIG. 6 illustrates the relation of view angle and distance for determining a tilt angle.

Similarly, assuming that H is a height of the image screen 40, and dh is a distance in the vertical direction from the center of the screen on the image screen 40 to the point P, a tilt angle At for moving the camera toward the point P is computed by the following equation based on the relations illustrated in FIG. 6.

$$\tan((a*H/W)/2) = H/2/R \quad (6)$$

$$\tan(At) = dh/R \quad (7)$$

a*H/W is a vertical view angle on the screen derived from the horizontal view angle "a" on the screen. R determined from equation (6) is entered into equation (7) to obtain equation (8):

$$\tan(At)=(2dh/H)*\tan((a*H/W)/2) \quad (8)$$

Accordingly, $$At=\tan^{-1}((2dh/H)*\tan((a*H/W)/2))$$

$$\tan^{-1}(\tan(a*H/2*W))*2dh/H) \quad (9)$$

In the angle-value calculating unit 29, the angle differences Ap and At are computed for moving the camera. A current angle value stored in the camera status memory 22 is added to Ap and At respectively, and the resulting values are sent to a direction controller 33 and an intersection-point calculating unit 31 (FIG. 1). The direction controller 33 sends these values to the camera unit 10 through the communication controller 21.

The intersection-point calculating unit 31 obtains an intersection-point of the direction to which the camera is directed and the pseudo subject-plane by the following method for determining an intersection-point of a straight line and a curved surface.

As the pseudo subject-plane comprises one or a plurality of quadric surface, individual curved surfaces can be expressed by the following general equation.

$$A*x^2+B*y^2+C*z^2+D*xy+E*yz+F*zx+G*x+H*y+I*z+J=0$$

where, A, B, C, D, E, F, G, H, I, and J are constants.

On the other hand, a straight line from the camera to the intersection point are expressed by the following parameter equation:

$$x=a*t+x_c$$

$$y=b*t+y_c$$

$$z=c*t+z_c$$

a, b, and c are constants representing the direction of a straight line, t (>=0.0) is a parameter, and a point ($x_c$, $y_c$, $z_c$) is position coordinates of the camera. When the above equation for straight lines are entered into the equation for the analytical curved surface, a value for t at an intersection-point is obtained. The value of t is entered into the equations for the straight lines to obtain the coordinates (x, y, z) of the intersection-point.

Thus, the coordinates of an intersection-point of the straight line representing the direction of the camera and the pseudo subject-plane are obtained.

Zoom Calculation

A zoom calculating unit 35 receives from the intersection-point calculating unit 31 the coordinates of the intersection-point of the direction line and the pseudo subject-plane, and computes a distance r from the camera to the intersection-point based on the three-dimensional coordinates. Using the distance r, a zoom amount z for maintaining a predetermined shooting range is computed by the following equation:

$$z=K_z*r+z_o$$

Figure 3:
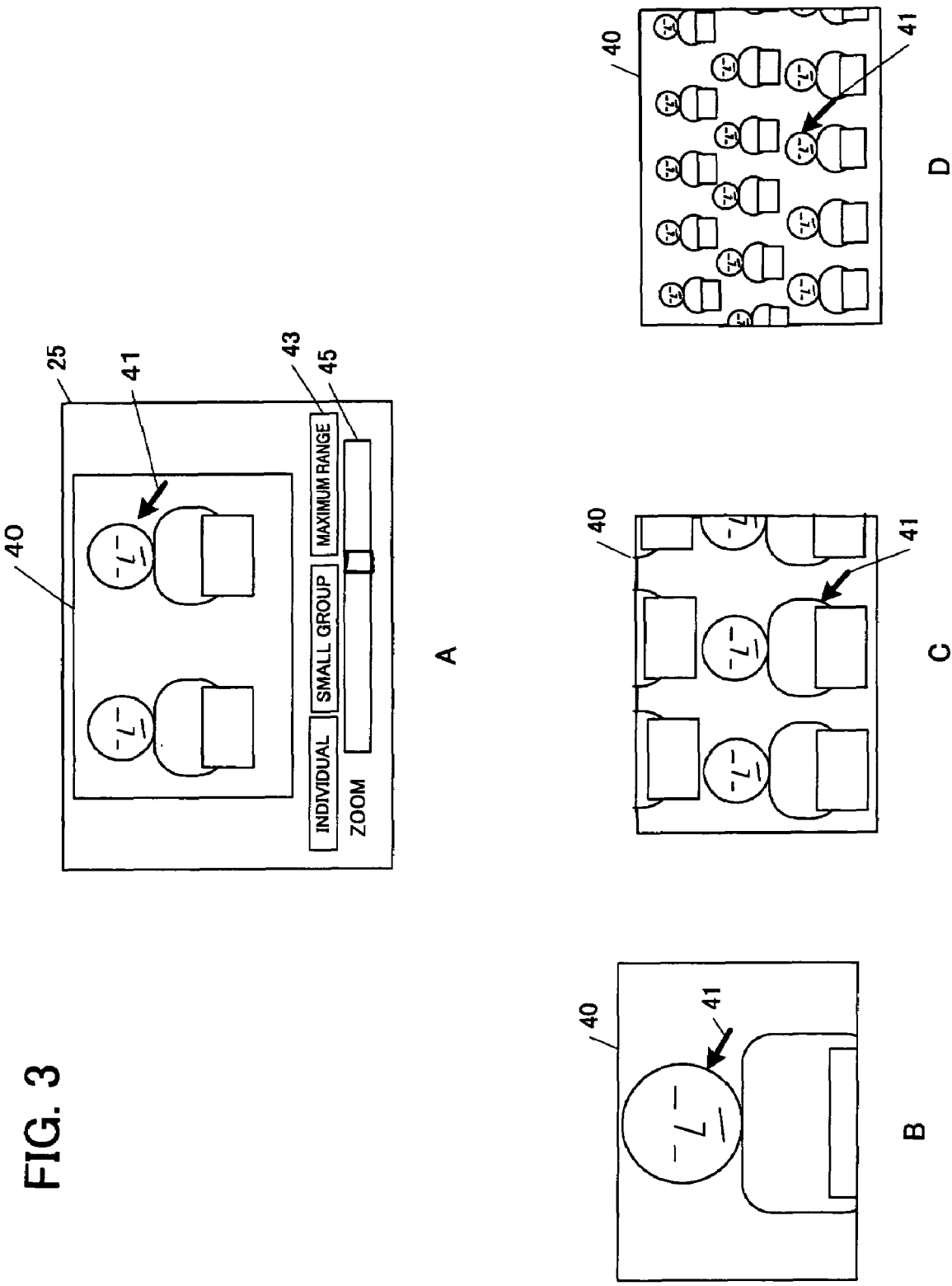
FIGS. 3A to 3D are views showing a monitor screen corresponding to various kinds of shooting ranges.

The zoom amount z is proportional to the distance r. $k_z$ is a proportionality factor, and $z_o$ is a constant. The above $k_z$ and $z_o$ are determined by the following procedure using a user interface as shown in FIG. 3A.

(1) A camera is directed to a subject, and a slider 45 for zoom adjustment is moved to have a desired range size. The user may enter a command with a keyboard or a mouse to store the range value. The current zoom amount z1 that has been transmitted from the camera unit through the communication controller 15 and has been stored in the camera-status memory 22, and a pseudo shooting distance r1 obtained through the above-described distance calculation are stored in a memory responsive to the command.

(2) The camera is directed to another subject (located at a distance different from that of the previous subject), zoom is adjusted so that the same range size as that of the previous subject is obtained, and the range value is stored responsive to a command entered with a keyboard or a mouse. The current zoom amount z2 transmitted from the camera unit, and stored in the camera-status memory 22, and a pseudo photographed distance r2 obtained through the above-described distance calculation are stored in a memory responsive to the command.

(3) The value obtained through the above two steps of operations is entered into the above-mentioned equation to obtain the following two equation:

$$z1=K_z*r1+z_o$$

$$z2=K_z*r2+z_o$$

$k_z$ and $z_o$ can be calculated from the two equations. The parameters may be estimated once and can be used for zoom control of all the range sizes. The larger the difference of the shooting distance between the two subjects used for parameter estimation is, the higher the accuracy of the parameters is.

Switching of Shooting Ranges

FIG. 3(A) shows a screen of the monitor 25 wherein images in a distant classroom are displayed on the image screen 40. A user can move an arrow 41 with a mouse, and when the user clicks at a certain position, angle values are calculated with the method described above for panning and tilting the camera to bring such a position at the center of the screen 40. In the example illustrated, three buttons 43, "Individual" button, "Small Group" button and, "Maximum Range" button, are provided on the screen of the monitor 25. In an alternative example, similar functions are provided not by the buttons, but by function keys on a keyboard. This way, the image screen 40 can be made relatively large.

When the "Individual" button is clicked, a zoom amount is calculated as described above in such a way that only one student is displayed on the full screen and a zoomed image is displayed on the screen as shown in FIG. 3B. When the "Small Group" is clicked, a zoom amount is calculated as described above in such a way that a small group of students are displayed on the image screen and a zoomed image is displayed on the screen as shown in FIG. 3C. When the "Maximum Range" is clicked, a zoom amount is adjusted in such a way that a maximum-shooting range of an image may be displayed on the screen as shown in FIG. 3D.

Though specific examples according to the present invention have been explained as described above, the invention is not limited to the above examples.

The invention can also be applied to a case in which a plurality of cameras are used at the same time. In this case, data on one pseudo subject-plane can be shared with a plurality of cameras. The cameras may be synchronized to share a pseudo subject-plane. When the direction of one camera (primary camera) is changed, the other cameras (synchronized cameras) are automatically directed to the subject the primary camera is going to shoot. The above configuration can be realized by directing the synchronized cameras to the intersection point of a straight line from the primary camera to the pseudo subject-plane intersects. In this case, each camera separately maintains its own shooting range, using its own zoom calculating means. Thus, a plurality of cameras can be simultaneously directed to the same subject, and can shoot the same subject with respective ranges different from one another.

Though the directing device was described as providing commands in relation to the image displayed on the display unit, the invention is not limited to such a device. A camera may be provided with a function of automatically tracking a specific subject. In an automatic tracking operation, the shooting range of the camera may be maintained based on the current direction of the camera and using the above-described zoom calculating means.

What is claimed is:

1. A control system for a camera, comprising:
    a memory configured to store coordinate data of a predetermined pseudo subject-plane representing a plane virtually covering people in a room to be shot with the camera, wherein the predetermined pseudo subject-plane is defined by three-dimensional coordinates in the room, and wherein the camera is provided at a predetermined position in the room, the position of the camera being identified by the three-dimensional coordinates in the room;
    a display unit provided at a place remote from the room and configured to instruct a direction of the camera based on an input by a user viewing an image displayed on the display unit, whereby an image of one or more persons in the room the user is interested in is captured by the camera;
    a determining unit configured to determine coordinates of an intersection point of a straight line from the camera extending in the direction instructed by the directing device with the pseudo subject-plane read from the memory;
    a distance calculating unit configured to calculate the distance from the camera to the intersection point based on the coordinates of the camera and the intersection point; and
    a zoom calculating unit configured to calculate a zoom amount of the camera needed to produce a predetermined shooting range based on the distance calculated by the distance calculating unit.

2. The control system according to claim 1, comprising:
    a camera-information registration memory configured to store the position of the camera expressed by three-dimensional coordinates in the subject space, the direction of the camera in an initial condition and information including a minimum view angle and a maximum view angle of the camera; and
    an angle-value calculating unit, responsive to an input from the directing device, configured to calculate angle values for panning and tilting based on status data transmitted from the camera and the information stored in the camera-information registration memory.

3. The control system according to claim 2, wherein the angle-value calculating unit is provided with a calculating unit configured to calculate an angle difference for shifting the current angle value transmitted from the camera to an angle value for directing the camera to the direction instructed by the directing device, and
    wherein said calculating unit is configured to:
        calculate a view angle corresponding to the width of an image screen of the display unit based on the current zoom amount, and
        compute a pan-angle difference based on the width of the image screen, a horizontal distance from the center of the image screen to the point on the image screen indicated by the directing device, and said view angle corresponding to the width of the image screen.

4. The control system according to claim 3, wherein the angle-value calculating unit is provided with an angle-value difference calculating unit configured to calculate an angle-value difference for shifting the current angle value transmitted from the camera to an angle value for directing the camera to the direction indicated by the directing device, and
    wherein said angle-value difference calculating unit is configured to:
        calculate a view angle corresponding to the height of an image screen of the display unit based on the current zoom amount, and
        compute a tilt-angle difference based on the height of the image screen, a vertical distance from the center of the image screen to the point indicated by the directing device, and said view angle corresponding to the height of the image screen.

5. The control system according to claim 1, wherein the pseudo subject-plane is formed by combining partial planes of one or a plurality of analytical curved surfaces.

6. A method for controlling a camera, comprising:
    storing in a memory coordinate data of a predetermined pseudo subject-plane representing a plane virtually covering subjects in a room to be shot with a camera, wherein the predetermined pseudo subject-plane is defined by three-dimensional coordinates in the room, and wherein the camera is provided at a predetermined position in the room, the position of the camera being identified by the three-dimensional coordinates in the room;
    displaying images captured by the camera on a display unit provided at a place remote from the room;
    instructing a direction of the camera based on an input by a user viewing the image displayed on the display unit such that an image of one or more persons in the room the user is interested in may be captured by the camera;
    determining coordinates of an intersection point of a straight line from the camera extending in the instructed direction with the pseudo subject-plane read from the memory;
    calculating the distance from the camera to the intersection point based on the coordinates of the camera and the intersection point; and
    calculating a zoom amount of the camera needed to produce a predetermined shooting range based on the calculated distance.

7. The method according to claim 6, further comprising:
    storing in a memory the position of the camera expressed by three-dimensional coordinates in the pseudo-subject-plane, an initial direction of the camera and information including a minimum view angle and a maximum view angle of the camera; and
    responsive to an instruction, calculating angle values for panning and tilting based on status data transmitted from the camera and the information stored in the memory.

8. The method according to claim 7, wherein the calculating of the angle-value includes calculating an angle difference between the current angle value transmitted from the camera and the angle value for directing the camera to the instructed direction, said calculating of an angle difference comprises:
    calculating a view angle corresponding to the width of an image screen based on the current zoom amount, and
    computing a pan-angle difference based on the width of the image screen, a horizontal distance from the center of the image screen to the point on the image screen indicated by said instructing, and said view angle corresponding to the width of the image screen, said instructing indicating a point on the image screen to instruct the direction of the camera.

9. The method according to claim 8, wherein the calculating of an angle-value includes calculating an angle difference between the current angle value transmitted from the camera and an angle value for directing the camera to the instructed direction, said calculating of an angle difference comprises calculating a view angle corresponding to the height of an image screen based on the current zoom amount, and computing a tilt-angle difference based on the height of the image screen, a vertical distance from the center of the image screen to the point indicated by the step of instructing the direction, and said view angle corresponding to the height of the image screen.

10. The method according to claim 6, wherein the pseudo subject-plane is formed by combining partial planes of one or a plurality of analytical curved surfaces.

* * * * *